UNITED STATES PATENT OFFICE.

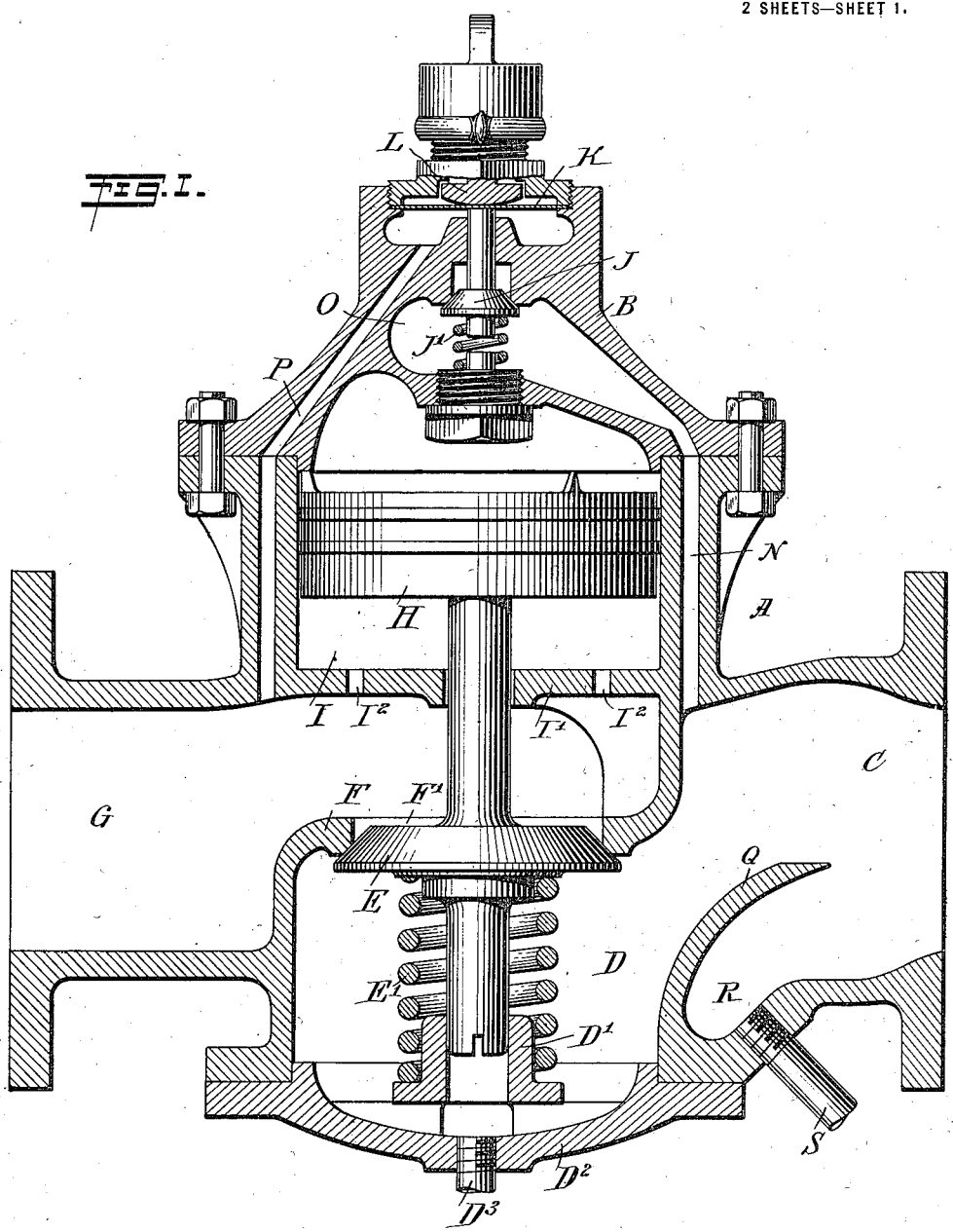

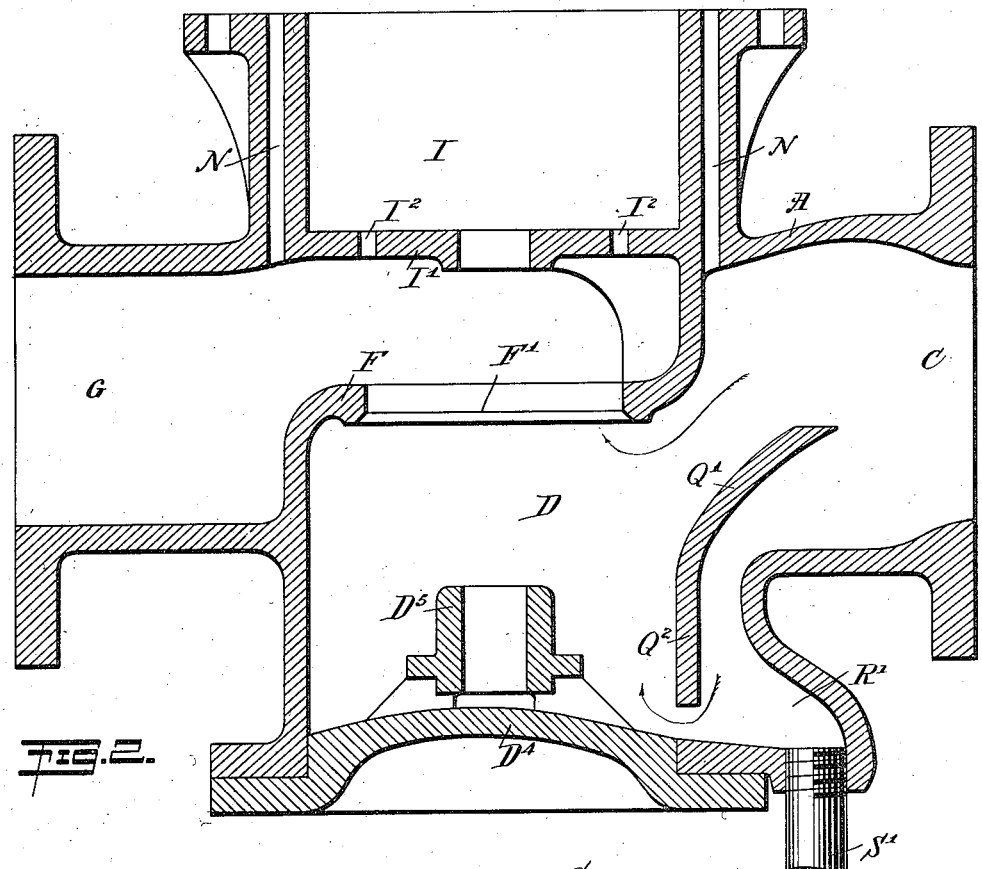
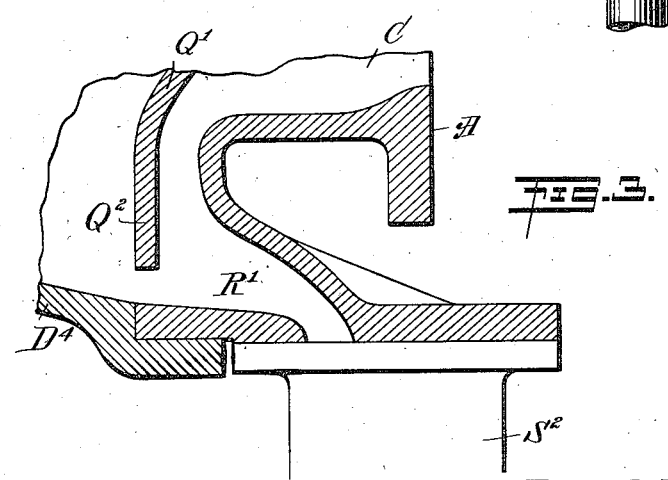

JULES P. METZGER, OF CARLSTADT, NEW JERSEY, ASSIGNOR TO THE LESLIE COMPANY, OF LYNDHURST, NEW JERSEY, A CORPORATION OF NEW JERSEY.

PRESSURE-REGULATOR.

1,173,835.

Specification of Letters Patent.

Patented Feb. 29, 1916.

Application filed October 9, 1913. Serial No. 794,259.

*To all whom it may concern:*

Be it known that I, JULES P. METZGER, a citizen of the Republic of France, and a resident of Carlstadt, in the county of Bergen and State of New Jersey, have invented new and useful Improvements in Pressure-Regulators, of which the following is a full, clear, and exact description.

The invention relates to pressure regulators in which the main or regulating valve is controlled by a piston governed by controlling means controlled by low pressure from the outlet side of the regulator to admit high pressure from the inlet side of the regulator.

A pressure regulator of the type mentioned is shown and described in the application for Letters Patent of the United States, Serial No. 794,258 filed by me under even date herewith.

The object of the invention is to provide certain new and useful improvements in pressure regulators of the type referred to whereby the internal working parts such as the main valve, piston and controlling valve, are relieved from moist steam or water of condensation or any sediment or other extraneous matter carried along by the steam, to render the regulator exceedingly sensitive to fluctuations in the pressure of the fluid. In order to accomplish the desired result use is made of a valve casing provided at the inlet with a drainage pocket for intercepting and carrying off the moist steam or water of condensation.

A practical embodiment of the invention is represented in the accompanying drawings forming a part of this specification, in which similar characters of reference indicate corresponding parts in all the views.

Figure 1 is a central vertical section of the pressure regulator provided with the improvements; Fig. 2 is a similar view of the valve casing showing a modified form of the drainage; and Fig. 3 is a like view of part of the valve casing provided with another form of drainage.

It is well known that in regulators of large size or with a long line of pipe connected with the same a great amount of condensation takes place and many times water is deposited in the various fittings along the pipe, sometimes through faulty draining of such pipes, but even with the best draining arrangements it is impossible to attain complete results in that regard. In starting up, the steam entering the cold pipes condenses and leakage at the various fittings produces the same result, so that the water passes into the pressure regulator and interferes with the proper working of the movable parts of the regulator. It is understood that the moist steam or water of condensation tends to fill all the ports and cavities of the pressure regulator and the controlling valve is therefore clogged up and is not free to act with any degree of sensitiveness and when it does work it is because of the continuous pressure of the fluid behind it which forces the water through the small clearance, and when partly relieved the controlling valve opens suddenly with a thump and the water is discharged or carried off at once in small jets and the valve will continue to thump or hammer until entirely relieved. With larger valves and with long lines of pipes in most cases conditions are much worse and many times when starting the regulator will be found to be partly and sometimes completely filled with water which has to be relieved before the regulator can function properly. The pressing of the moist steam or water of condensation in the pressure regulator sometimes causes the breaking of a main valve or distortion of some part and usually erosion or defective valve seats is the result, and there is always the danger of rupture of some part of the regulator taking place. It is evident that the pressure regulator in a very short time becomes inefficient and must be repaired or fitted over to produce the desired regulation. With the improvements presently to be described in detail the water of condensation from the connected pipe line or which may form within the pressure regulator is prevented from reaching the working parts so that practically dry steam only will come in contact with the working parts.

The pressure regulator shown in Fig. 1 consists in its general construction of a valve casing A provided on top with a cap B and having at one side an inlet C leading to a main valve chamber D arranged in the bottom of the casing A. A partition F is provided with a valve seat F' and separates the valve chamber D from the outlet G, and on the said valve seat F' is adapted to be seated a main or regulating valve E pressed on by a spring E' to normally hold the valve E to its seat F'. The bottom of the spring E' rests on a guide D' attached to or forming part of a cap $D^2$ for closing the bottom of the main valve chamber D. A drain pipe $D^3$ leads from the cap $D^2$ to carry off the water of condensation that may flow onto the bottom cap $D^2$. The main valve A is connected with a piston H mounted to reciprocate in a cylinder I separated from the outlet G by a partition or a bridge I' having openings $I^2$ for the passage of the steam into the lower end of the cylinder I. Admission of steam to the upper end of the cylinder I from the inlet C is controlled by a controlling valve J held to its seat by a spring J' and controlled by a diaphragm K pressed on at the top by a spring regulating device L adapted to be set to a desired pressure. Steam from the inlet C passes by way of a port N into an expansion chamber O containing the valve J and its spring J', as more fully described in the application above referred to, and the under side of the diaphragm K is subjected to pressure of the steam from the outlet G by way of a port P. When the pressure outlet G falls below a certain predetermined gage pressure the valve J is moved into open position by the action of the device L on the diaphragm K to allow steam to pass into the upper end of the cylinder I to force the piston H downward therein to open the valve E more or less against the tension of its spring E'.

In order to relieve the working parts referred to of moist steam or water of condensation, the following arrangement is made: In the lower part of the inlet C is arranged a transverse partition Q curved upwardly and outwardly, as plainly indicated in Fig. 1, the said partition Q forming with the wall of the inlet C a pocket R from which leads a pipe S for carrying off the water of condensation. Now it will be noticed that any incoming moist steam or water of condensation from the pipe line is intercepted in the inlet C by the partition Q and is retained in the pocket R from which the water of condensation is carried off by the pipe S to a suitable place of discharge. By this arrangement the water of condensation is not liable to be carried to the working parts and hence the same are relieved and are free to work properly.

In the modified form shown in Fig. 2 the partition Q' in the inlet C is provided with a downward extension $Q^2$ forming with the bottom of the casing A a pocket R' from which leads the drainage pipe S' for carrying off the water of condensation. The bottom cap $D^4$ for the main valve chamber D is in this case convex and supports the guide $D^5$ above its crown which latter is above the bottom of the pocket R' so that any water of condensation that may pass into the main valve chamber D flows off the convex cap $D^4$ under the extension $Q^2$ and into the pocket R' to be carried off by the pipe S'; and likewise the water of condensation coming from the pipe P and entering the inlet C is intercepted by the partition Q' and directed down into the pocket R'. Instead of connecting the bottom of the pocket R' with the pipe S' the said pocket may be connected with a separator $S^2$, as indicated in Fig. 3, otherwise the construction shown in this figure is the same as the one illustrated in Fig. 2.

From the foregoing it will be seen that means have been provided to continually intercept the water of condensation and carry the same over to prevent possible water hammering under the main valve or water passing into the chamber O, it being understood that any water of condensation which may occur in the chamber O flows down the port N into the inlet C to be carried off either by the pipe $D^3$, as shown in Fig. 1, or by the pipe S' or the separator $S^2$, as illustrated in Figs. 2 and 3.

The inlet C may be enlarged and curved to afford a proper cross sectional area at all points, but it is evident that this may be varied in accordance with the requirements, and the inlet C may be made of a size corresponding to the inlet pipe conditional upon the ratio of reduced pressure to the inlet pressure desired. The partition or wings Q or Q' may be made of different shapes without altering the scope or function of the present improvements.

Having thus described my invention, I claim as new and desire to secure by Letters Patent:

1. A pressure regulator of the class described provided with a casing having an inlet at one side and a main valve chamber at the bottom and in communication with the said inlet, a drainage pocket in the said casing in advance of the valve chamber and communicating with the said inlet and with the said valve chamber, the bottom of the valve chamber being convex and draining into the said drainage pocket, and a drainage pipe leading from the said pocket.

2. A pressure regulator of the type described provided with a casing having an inlet at one side and a main valve chamber at the bottom, the said valve chamber being closed at the bottom by a convex cap having a raised guide for the stem of the main valve, a transverse partition arranged in the said inlet and curved upwardly and forwardly to intercept incoming moist steam and water of condensation, the partition having a downward extension adjacent one side of the said main valve chamber, the lower end of the extension terminating a distance above the lower edge of the said cap, the said extension forming a drainage pocket with the opposite side of the casing, and a pipe leading from the said pocket.

3. In a pressure regulator of the character described, the combination of a casing having a valve seat between its inlet and outlet and a valve chamber below its said seat, a valve coöperating with the seat, a spring arranged beneath the valve for controlling the same, an elevated support arranged upon the base of the valve chamber and forming a valve guide and a seat for the said spring, the said base of the valve chamber sloping downwardly away from a point beneath the said support, a transverse partition arranged to cross the inlet side of the valve chamber to form a drainage pocket at one side of the chamber, and having its lower edge spaced from the base of the chamber and its upper edge extending upwardly and angularly into the inlet, and a drainage tube leading from the drainage pocket, all for the purpose described.

In testimony whereof I have signed my name to this specification in the presence of two subscribing witnesses.

JULES P. METZGER.

Witnesses:
 THEO. G. HOSTER,
 PHILIP D. ROLLHAUS.